Figure 1:
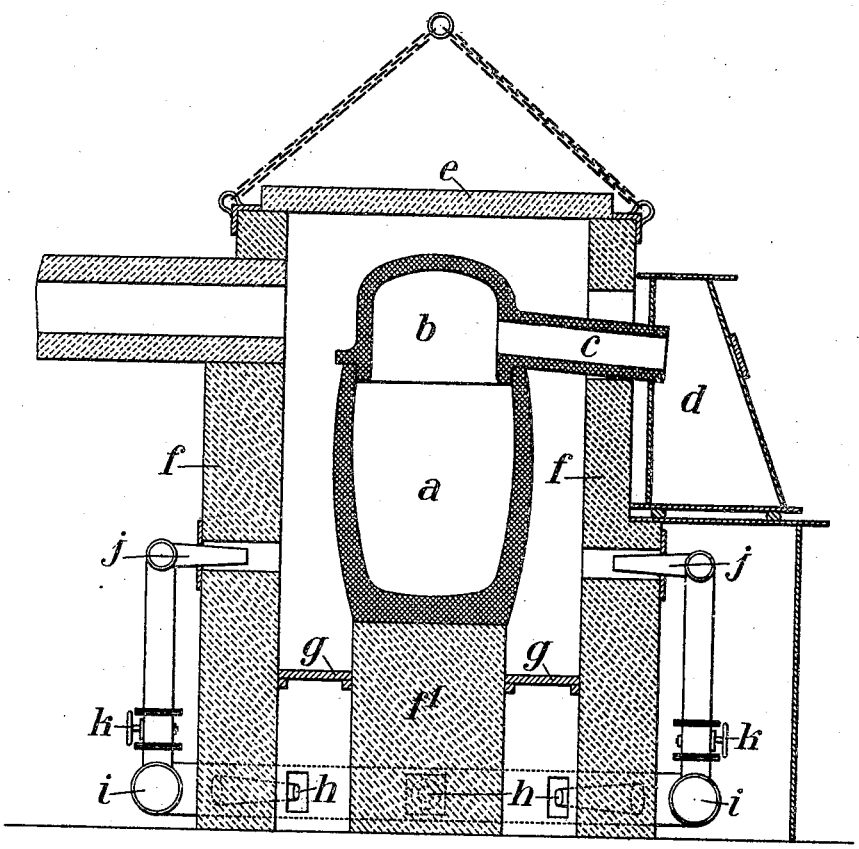

No. 807,271. PATENTED DEC. 12, 1905.
A. H. IMBERT.
PROCESS OF EXTRACTING METALS FROM THEIR SULFIDS.
APPLICATION FILED DEC. 22, 1903.

4 SHEETS—SHEET 1.

No. 807,271. PATENTED DEC. 12, 1905.
A. H. IMBERT.
PROCESS OF EXTRACTING METALS FROM THEIR SULFIDS.
APPLICATION FILED DEC. 22, 1903.

4 SHEETS—SHEET 3.

No. 807,271.  
PATENTED DEC. 12, 1905.

A. H. IMBERT.  
PROCESS OF EXTRACTING METALS FROM THEIR SULFIDS.  
APPLICATION FILED DEC. 22, 1903.

4 SHEETS—SHEET 4.

UNITED STATES PATENT OFFICE.

ANTOINE HENRI IMBERT, OF GRAND-MONTROUGE, FRANCE.

PROCESS OF EXTRACTING METALS FROM THEIR SULFIDS.

No. 807,271.  Specification of Letters Patent.  Patented Dec. 12, 1905.

Application filed December 22, 1903. Serial No. 186,179.

*To all whom it may concern:*

Be it known that I, ANTOINE HENRI IMBERT, engineer, a citizen of the French Republic, residing at 75 Avenue de la République, Grand-Montrouge, Department of the Seine, France, have invented a new and useful process for extracting from their sulfids zinc and lead and generally all metals whose affinity for sulfur is inferior to that of copper, of which the following is a specification.

Copper is well known to act as a very energetic desulfurizer toward most of the ordinary metals. In particular if copper be mixed with blende (zinc sulfid ZnS) or with galena (lead sulfid PbS) or with a mixture of these two sulfids constituting a complex ore and if the proportions taken be such that the whole of the sulfur is combined with the copper, the other metal or metals being liberated, then on the mixture being suitably heated the following reaction will be set up:

$$ZnS + 2Cu = Cu_2S + Zn,$$

or $$PbS + 2Cu = Cu_2S + Pb,$$

or, again, $$ZnS + PbS + 4Cu = 2Cu_2S + Zn + Pb.$$

Generally speaking, if M be taken to represent the metal whose affinity for sulfur is inferior to that exhibited by copper the reaction $$MnS + 2n^1Cu = n^1Cu_2S + nM$$

will take place. The next stage of the process consists in recovering the copper, which, as is well known, may be easily effected by the Bessemer process—namely, by blowing air through the resulting copper sulfid. Hence the same copper may be employed indefinitely for treating fresh quantities of raw material.

In practice the following method is adopted: For the extraction of lead a mixture is prepared of coarsely-crushed galena and granulated metallic copper in exact proportion to saturate the sulfur of this galena and to form copper sulfid $Cu_2S$. The mixture may be placed, for example, in a crucible capable of resisting the action of galena, preference being given to a graphite crucible, and the whole is heated to a relatively low temperature, about 800° centigrade. The method employed for treating blende is exactly the same, and at the commencement of operations the reactions are identical. The blende, which by itself is almost infusible at a very high temperature, fuses readily in presence of copper at a temperature approaching 1,000°. Toward 1,100° to 1,200° the zinc escapes from the molten mass with great rapidity and under violent ebullition, and may then be condensed (preferably to the molten state) by any known means. The same procedure may be adopted with a complex mineral containing zinc and lead in any relative proportions whatsoever. The same phenomena occur, but at temperatures varying in accordance with the predominance of one sulfid or the other.

If care be taken to protect the lead which accumulates at the bottom of the crucible from exposure to the greater heat necessary for vaporizing the zinc, the contamination of the zinc-vapors with those of the boiling lead is prevented. With this object in view and depending upon the apparatus employed in the application of the process the operation may be conducted in two ways.

First. If use be made of a graphite crucible with condensing-hood of the kind employed for treating the rich alloys of the desilverizing process—such, for instance, as is illustrated in Fig. 1 of the accompanying drawings—then at the moment the mass becomes completely fused and while the whole of the lead is collected in the bottom of the crucible an air-blast is introduced at a short distance above the floor of the vessel. During the fusion process the air is introduced below the grating; but as soon as fusion is complete the air is admitted through a series of twyers, which discharge above the grating at a height which depends on the diameter of the crucible and the height of its support.

In the accompanying drawings there are shown two forms of apparatus capable of use in carrying out the invention, in which—

Figure 2:
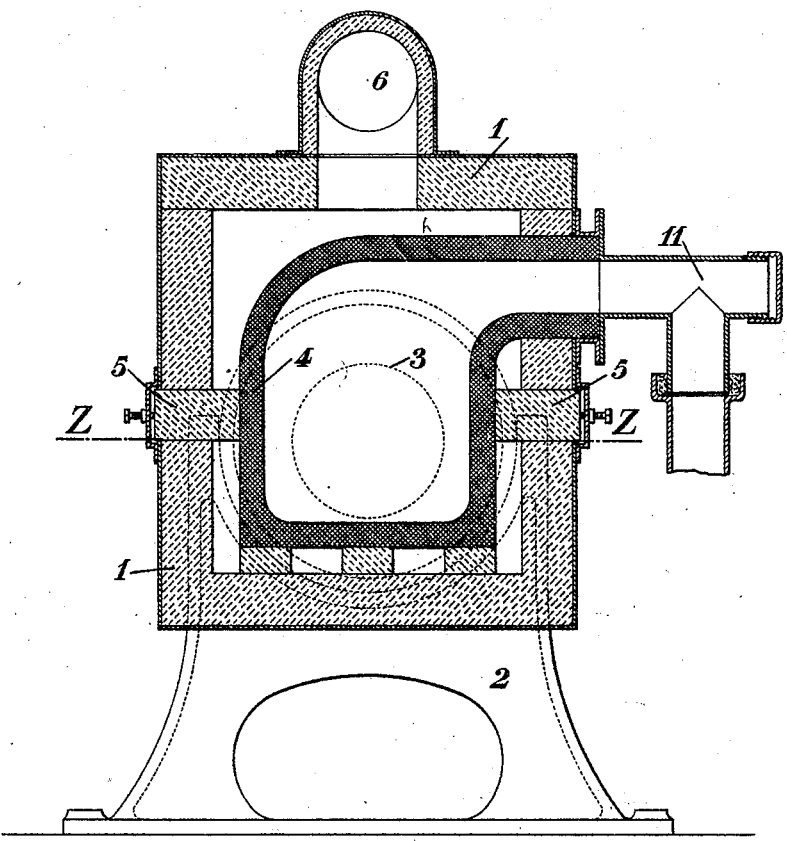
Figure 3:
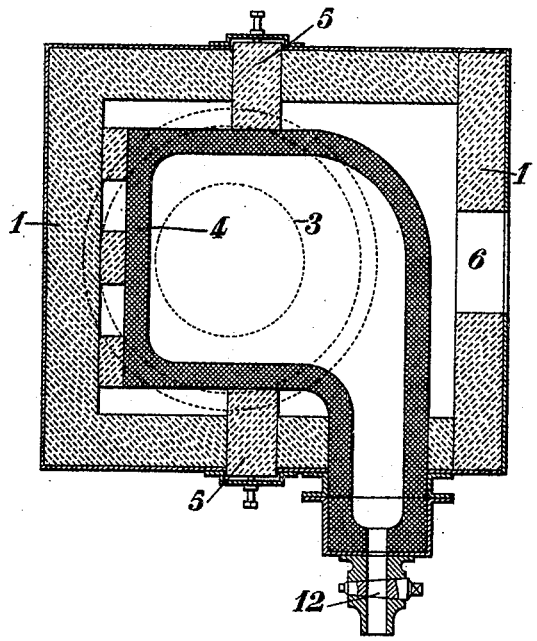
Figure 4:
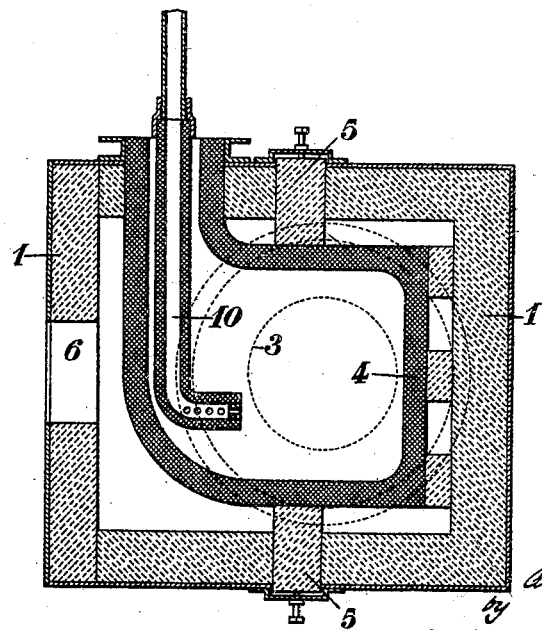
Figure 5:
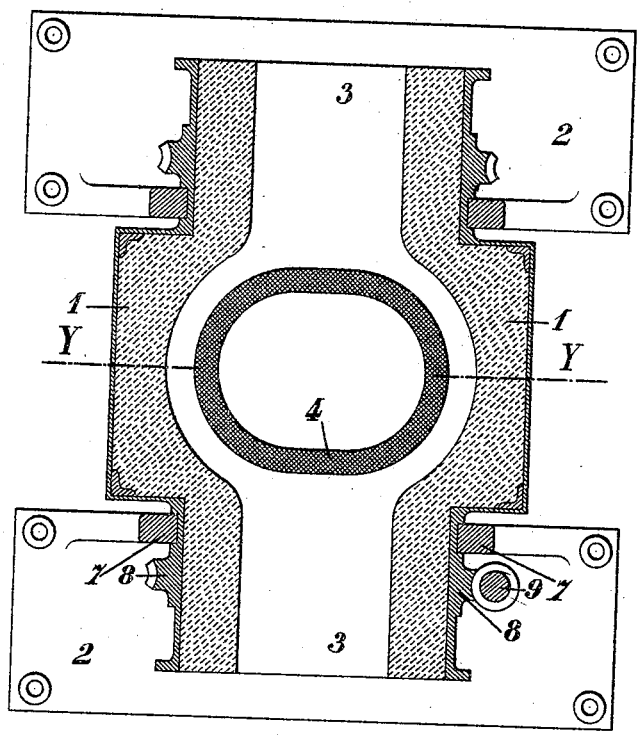

Figure 1 is a vertical section of one form of furnace. Figs. 2, 3, and 4 are vertical sections of another form of furnace, showing the parts in different positions; and Fig. 5 is a sectional plan view of the same.

In Fig. 1, $a$ is a graphite crucible, similar to those employed in desilvering works, fitted with a movable hood $b$, to which is attached a graphite tube $c$, leading to the condenser $d$. The crucible is supported and entirely surrounded by a furnace $f$ and $f'$, made of refractory materials and having a removable top $e$. The lower part of the furnace has a grate $g$, beneath which are the twyers $h$, coupled to the main pipes $i$, which distribute the compressed air for the blast. At a certain height above the bottom of the crucible are the twyers $j$, which serve to raise the plane of maximum heat. Valves $k$ between the blast-distributing pipes and the upper twyers serve to shut off or regulate the blast to these latter. The valves $k'$ control the twyers $h$. The furnace having been heated to the desired temperature, the charge of mineral, with the necessary quantity of reagent added, is tipped into the crucible through the movable top $e$. The top having been replaced, the ordinary heating, using the lower twyers $h$ below the grate, goes on till the entire charge is completely fused. At this moment all the lead is collected at the bottom of the crucible. Then in order to prevent the lead collected at the bottom from being exposed to the higher temperature necessary for vaporizing the zinc, and so hinder the contamination of the zinc-vapors by those of the lead, the valves $k'$ are closed, thus cutting off air from the twyers $h$, and air is admitted, by means of the valves $k$, into the upper twyers $j$, which discharge above the grate and at a certain height above the bottom of the crucible, which depends on its size. The furnace is then heated by the aid of the upper twyers up to the boiling-point of zinc, the vapors of which, passing through the tube $c$, are condensed in the condenser $d$.

Second. If the crucible is in the shape of a retort of the inclined type heated from the outside, like those also used for rich desilverizing alloys, it is necessary when the fusion is complete to run the lead off alone through a very small tap-hole closed by an easily-drawn plug, the drawing off being suspended as soon as any fused matter other than lead makes its appearance. When this method is adopted, it is advantageous to fuse the original mixture in a tipping crucible without a hood, there being no appreciable liberation of zinc before the whole of the mass is in a molten state. This method may be advantageous when crude unconcentrated minerals are to be treated, the gangues of which form at the surface of the bath a scarcely-fritted mass infusible at the melting temperature of the rest of the charge and which it is desirable to remove before distilling the zinc in a retort, and it is precisely in such cases that difficulty would be experienced in eliminating the unmelted gangues. The extra manipulation would then exceed the loss of heat caused by the necessity for a second melting. The method of treatment, therefore, depends on the circumstances of each case.

In all instances where the process can be employed the whole of the copper introduced into the smelting-bath is recovered as a residue. This copper is in the form of sulfid $Cu_2S$. Now it has long been known that when a matte has been obtained in the treatment of copper ores it is possible by means of Manhe's and David's adaptation of the Bessemer process to the metallurgy of copper to reduce the copper to the metallic state by blowing air into the molten copper sulfid remaining as a final compound after the iron has been removed by scorification at the expense of the converter-lining. Therefore by applying this method to the copper sulfid remaining as an indefinitely-renewed residue of the application of the present process the whole of the copper introduced into the initial mixture may be recovered in the state of metal. There cannot be any appreciable loss, the copper sulfid being pure and free from any concomitant scorification. At the same time the lining of the converter remains intact and may be made of graphite or any material that does not react on copper sulfid. This recovery of the reagent is effected without any consumption of fuel beyond that requisite to furnish the motive power for supplying the compressed air to the converter.

An apparatus for the application of the process to complex minerals as well as to simple ones, such as galena blende, is diagrammatically illustrated on Figs. 2, 3, 4, and 5 of the accompanying drawings, in which—

Figs. 2, 3, and 4 are sectional elevations on line Y Y of Fig. 5, showing the furnace in its various working positions; and Fig. 5 is a sectional plan view on line Z Z of Fig. 2.

The furnace 1 is of the oscillating type carried by trunnions journaled in the framework 2. The means of heating are not shown. The heating medium is supposed to enter the furnace through the hollow trunnions 3.

4 is a graphite crucible of same shape as those employed in crystal works. This is a sort of retort the neck of which extends through the wall of the inclosing furnace and is fitted with a cast-iron flange, to which can be adapted variously-shaped mouthpieces, according to the stages of the operation.

1 is the oscillating envelop of refractory material, held and strengthened by a shell in plate and cast-iron, the whole forming the furnace in which is placed the crucible. The latter is supported at the bottom by bricks spaced so as to allow the flames to circulate under and around it, and at the sides unoccupied by the trunnions, by bricks 5 penetrating into the furnace through corresponding holes and held by a stirrup and a screw. The refractory plate which forms the cover has an orifice, to which can be fitted a movable flue 6, leading to the chimney. The two other sides carrying the trunnions are each fitted with a thick cast-iron cylinder 7 of considerable diameter cast on the plate. These cylinders are lined internally with refractory material. Outside they carry a turned portion forming a bearing 3 and a worm-wheel 8, gearing with an endless screw 9, fitted with a hand-wheel for working it, and, further, a flange on which is bolted a covering-plate carrying the heating apparatus, which may be the burner of a gazogene, a rich-gas blowpipe, a mineral-oil burner, &c., fed with air at the required pressure in accordance with the system employed.

The furnace having been heated to the desired temperature, it is tipped into the position of Fig. 4; but the twyer 10 is not introduced. By means of a funnel the charge of mineral mixed with the necessary quantity of the reagent required for a first operation is tipped into the mouth of the crucible. The furnace is then raised to the position of Fig. 2; but the condensing-mouthpiece 11 is not fitted. The heating then goes on till the entire charge is melted, (this can be discovered by reversing the furnace to position, Fig. 4, and then sounding with an iron rod,) when the furnace is moved into position, Fig. 3, after fitting the tap 11. When the fusion is completed, all the lead, with the silver, if the mineral contains any, is formed and has collected at the bottom of the bath. The movement of tipping into the position of Fig. 3 causes the lead to run into the pocket formed by the mouth of the crucible. The tap 12 is then opened and the lead runs into ingot-molds placed beneath. When all the lead has run out, the tap 12 is closed, the furnace lifted into position, Fig. 2, and the condensing-mouthpiece 11 fitted. The furnace is then heated up to boiling-point of zinc. When all the zinc has been vaporized, which can be discovered by opening the screwed plug, there only remains to operate the regeneration of the reagent. The furnace being tipped into position Fig. 4, the twyer 10 is introduced into the mouth of the crucible and the air-blast, coupled to end of twyer by a flexible pipe, turned on. The reagent is regenerated after a certain lapse of time, and it is easy to discover when the operation is completed. If necessary, a green-wood pole can be introduced in place of the twyer to destroy any oxidation that may have taken place. Afterward the funnel is placed on the mouth and a new charge of mineral tipped into the crucible, but this time without any reagent, for this latter is already in the crucible and in a state of preparation for another operation. The furnace is replaced into position, Fig. 2, and the operation continues, as already described. After the regeneration of the reagent if unconcentrated minerals containing a certain proportion of gangues have beem employed the slag should be taken away. This can be done by tipping the furnace into a position beyond position Fig. 4. This causes the slag floating on the molten mass to come to the mouth of the crucible, from whence it is withdrawn with an iron rake or spoon. The slag is gathered into a vessel and left to cool, after which it is crushed and used to recuperate any parcels of the reagent which may have been mechanically carried over.

It is advantageous to heat the mineral beforehand in any kind of crucible or even in an open-hearth reducing-furnace. The output of the apparatus is thereby considerably increased with quite an insignificant increase of fuel.

From the foregoing it will be seen that the advantages in favor of the process are as follows: In the case of simple ores, galena, or blende taken separately abolition of any preliminary roasting. The consumption of fuel is reduced to the minimum necessary for the fusion of the galena at a moderate temperature, followed immediately by the removal of the lead and the recovery of the copper. In the case of blende the consumption of fuel is reduced to the amount required for effecting fusion at a medium temperature and maintaining that temperature during the distillation of the zinc, which is effected very rapidly, the entire reaction being performed during the period of fusion; an important saving in the wear and tear of the vessels employed for the reaction; a very considerable decrease in manipulation; in the case of complex ores, mixtures of galena and blende in any proportions whatsoever; non-necessity for any separation of the two sulfids by hand or mechanical appliances; abolition, in most cases, of any concentration process; easy treatment, restricted to a simple process of fusion, followed by distillation of the zinc liberated in large bubbles from the molten mass; complete and easy utilization of ores that are very abundant and generally left unworked. These advantages are entirely due to the adoption of copper as reagent, this being recovered indefinitely by the classic operation of the Bessemer process.

From the foregoing description it also follows that the process is applicable to the extraction (from their sulfids) of all metals whose affinity for sulfur is inferior to that of copper; furthermore, that no special form of apparatus is necessary for carrying out the process.

Having now particularly described and ascertained the nature of my said invention and in what manner the same is to be performed, I declare that what I claim is—

1. The process for extracting from its sulfid, a metal having less affinity for sulfur than is possessed by copper, consisting in mixing the sulfid of such metal with the amount of copper only sufficient to combine with the whole of the sulfur, in heating this mixture to a temperature suitable for the reaction for forming copper sulfid and liberating the other metal, and collecting this liberated metal and the copper sulfid separately.

2. The process for extracting zinc from blende, consisting in mixing the blende with the necessary fluxes and copper, in progressively heating the mixture to the vaporization temperature of zinc, removing the vaporized zinc and condensing the same, in separating the resulting copper sulfid and the scoriæ, and in recovering the copper from the sulfid in order that it may be used over again.

3. The process of extracting zinc and lead from a complex ore containing blende and galena, consisting in adding to the ore the necessary copper and fluxes; in heating the mixture to the vaporization temperature of zinc, but maintaining the lead at a temperature below the vaporizing-point of this latter metal, in condensing the vaporized zinc and drawing off the molten lead; in separating the resulting scoriæ and copper sulfid; and in recovering the copper from the sulfid, in order that it may be used over again substantially as described.

In testimony whereof I have signed my name to this specification in the presence of two subscribing witnesses.

ANTOINE HENRI IMBERT.

Witnesses:
GORDON D. STURROCK,
CLAUDIUS LUSSON.